United States Patent Office

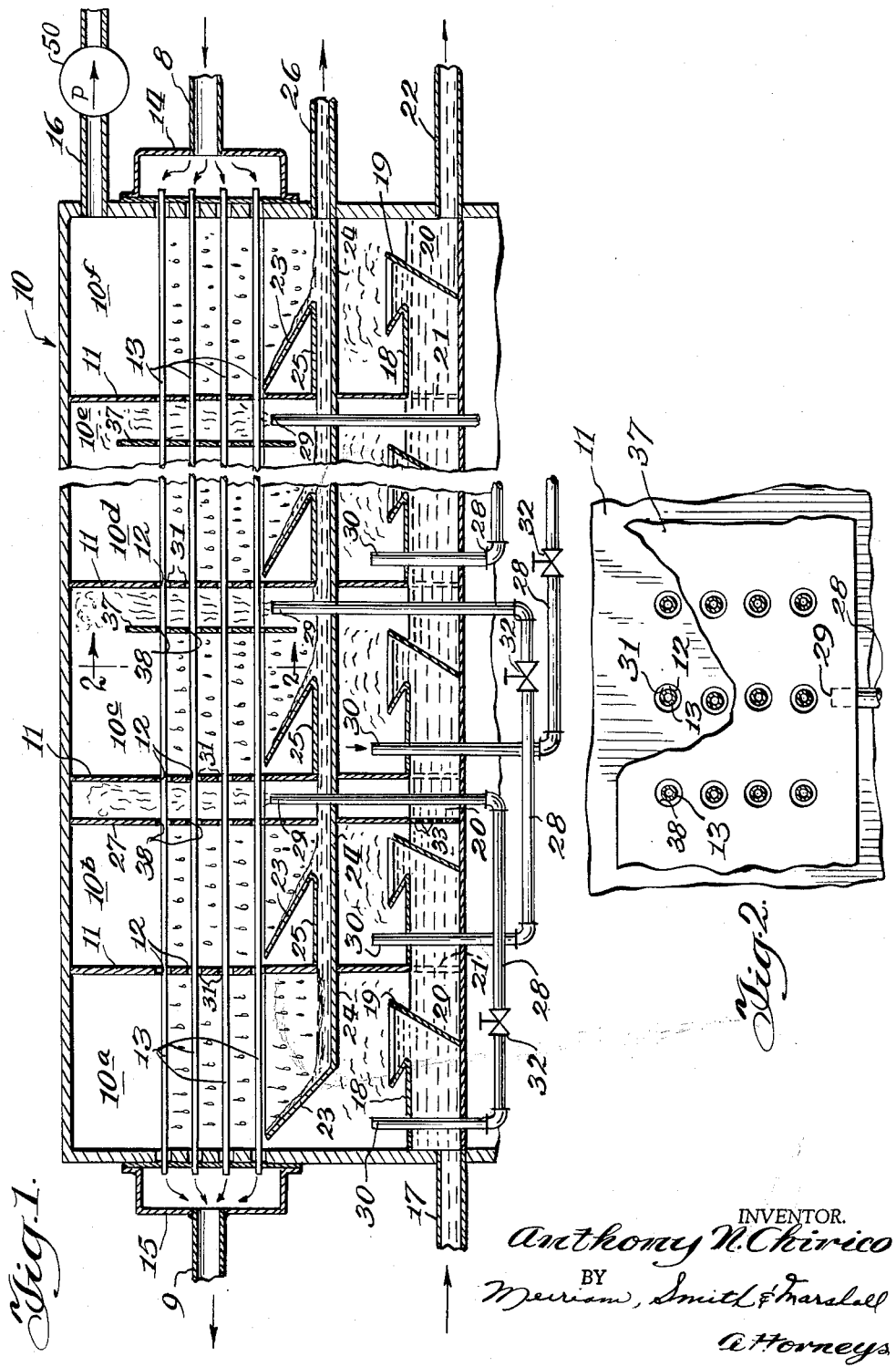

3,180,805
Patented Apr. 27, 1965

3,180,805
MULTI-STAGE FLASH EVAPORATION SYSTEM
Anthony N. Chirico, Naperville, Ill., assignor to Chicago Bridge & Iron Company, Chicago, Ill., a corporation of Illinois
Filed Sept. 1, 1961, Ser. No. 135,665
9 Claims. (Cl. 202—173)

The present invention relates generally to multi-stage flash evaporation systems, such as that used to separate fresh water from sea water, and more particularly to a system of this type including apparatus for simultaneously minimizing the leakage of condensable gases between stages while venting non-condensable gases successively through the stages and out of the system.

Basically, the instant invention relates to a multi-stage flash evaporation system comprising an elongated chamber divided into a plurality of adjacent stages by a plurality of spaced, transversely extending primary baffles. Each primary baffle includes a channel for the passage of vaporizable liquid, and a channel for the passage of condensate. Extending through aligned openings in the primary baffles are a plurality of longitudinally disposed condenser tubes. Means are provided for maintaining successive stages in the chamber at succeedingly lower pressure; means are provided for conducting successively through the stages a liquid (such as heated sea water) having non-condensable gases entrapped therein and which is vaporizable to produce condensable and non-condensable gases, and means are provided for conducting condensate successively through the stages and out of the chamber.

Between the inner edge of any of said openings in the primary baffle and the outer surface of that portion of a condenser tube extending through the opening is an unsealed annulus or opening through which gases can leak from a stage of higher pressure to a lower pressure stage. Because these openings are relatively inaccessible from a maintenance standpoint, it is not desirable to close the openings with replacement-requiring mechanical seals which can corrode away in the severe atmospheres present in desalting systems or other flash evaporation systems.

Leakage of condensable gases from stage to stage is undesirable because this type of leakage lowers the efficiency of the system. In addition, the non-condensable gases must be withdrawn from the chamber in order to maintain the lower pressures in the chamber, decreasing successively from stage to stage.

In the subject flash evaporation system means are provided for simultaneously venting the non-condensable gases through succeeding stages and out of the chamber while minimizing leakage of condensable gases from one stage to another through the unsealed openings in the primary baffles. More specifically, a number of the stages are provided with a transversely extending secondary baffle adjacent the primary baffle, and a conduit having an outlet end extending into the space between the primary and secondary baffles and an inlet end extending into another stage at a higher pressure than the stage into which the outlet end extends. Due to the pressure differential between the inlet and outlet ends of the conduit, non-condensable gases from the higher pressure stage flow through the conduit into the lower pressure stage and accumulate in the space between the primary and secondary baffles. This build-up of non-condensable gases in said space in the lower pressure stage, adjacent the unsealed openings of the primary baffle, substantially prevents condensable gases in the same stage from accumulating in that space and from passing through the unsealed openings in the primary baffle.

Such condensable gases as are conducted from the stage of higher pressure through the conduit and into the stage of lower pressure are directed towards the condensing tubes in the latter stage which cause the condensable gases substantially to return to the liquid state, thus eliminating further inter-stage passage by these condensable gases. The non-condensable gases accumulated in the space between the primary and secondary baffles flow through the unsealed openings to the next succeeding stage from which they enter the inlet end of another conduit and follow the same sequence described above. Eventually, the non-condensable gases reach the stage of lowest pressure in the apparatus, from which the non-condensable gases are exhausted by a pump.

Thus, by utilizing a combination of gas-directing and confining means, to be subsequently described in greater detail, structure is provided for simultaneously (a) minimizing the leakage of condensable gases from one stage to another through unsealed openings in the primary baffles separating the stages and (b) venting the non-condensable gases successively through the stages and eventually out of the system.

Other features and advantages are inherent in the structure claimed and disclosed, as will become apparent to those skilled in the art from the following detailed description in conjunction with the accompanying drawings wherein:

FIGURE 1 is a schematic diagram, in longitudinal section, showing an embodiment of a multi-stage flash evaporation system constructed in accordance with the present invention; and FIGURE 2 is a sectional view taken along line 2—2 in FIGURE 1.

Referring initially to FIGURE 1 there is shown an embodiment of a multi-stage flash evaporation system constructed in accordance with the present invention and comprising an elongated chamber 10 divided into a plurality of adjacent stages 10a–f by a plurality of spaced, transversely extending primary baffles 11. Each baffle 11 has a plurality of aligned openings 12 through which extend a plurality of longitudinally disposed condenser tubes 13 having opposite ends connected to an inlet manifold 14 and outlet manifold 15 respectively. The fluid passing through condenser tubes 13 enters inlet manifold 14 through conduit 8 and is conducted away from outlet manifold 15 through conduit 9.

Each of the stages, reading from left to right in FIGURE 1, is at a succeedingly lower pressure, as a result of the stage 10f being connected by a conduit 16 to a vacuum pump illustrated schematically at 50. In other words, stage 10b is at a lower pressure than stage 10a; stage 10c is at a lower pressure than stage 10b; and so forth, with stage 10f being at the lowest pressure.

The liquid to be vaporized (e.g. heated sea water) is introduced into the system through an inlet conduit 17 leading into liquid-receiving means 18 in stage 10a, which stage is at a lower pressure than the source of the liquid. Accordingly, the liquid to be vaporized flows into receiving means 18 and rises into an open upwardly-outwardly flaring top portion 19 from which a portion of the liquid flashes off into a vapor consisting of condensable gases (such as water vapor) and non-condensable gases (such as carbon dioxide or air previously entrapped in the liquid). These gases rise and contact condenser tubes 13 causing the condensable gases (such as the water vapor) to condense on the tubes, forming droplets which drip downwardly and are caught by an inclined plate 23 which directs the droplets to a trough 24 communicating through an opening or channel in primary baffle 11 with a conduit 25, extending into the next adjacent stage 10b, and in turn communicating with another trough 24, etc.

Some of the liquid entering receiving means 18 overflows top portion 19 and drops down into a lower stage portion 20. This overflowed liquid passes into the next stage (e.g. 10b) by flowing through channel on weir means 21 constituting a continuation of primary baffle 11 and separating the lower portions of adjacent stages. Because stage 10b is at a lower pressure than the preceding stage 10a from which the liquid in 10b has come, there is a flash evaporation of a portion of this liquid, like that previously described with reference to stage 10a. The flash evaporation of a part of the liquid into condensable and non-condensable gases, and the condensation of the condensable gases as droplets on tubes 13, from which the droplets drip onto inclined plate 23 and into trough 24, is repeated from stage to stage, the condensed fresh water passing successively through adjacent condensate-accumulating troughs 24 and conduits 25 to be eventually conducted out of the chamber 10 by an outlet conduit 26 which leads to a reservoir or receptacle for the fresh water. The remaining residue (e.g. brine containing a relatively high concentration of salt) accumulates in lower portion 20 of the last stage 10f and is conducted out of chamber 10 through a conduit 22.

The cooling fluid passing through condenser tubes 13 may be raw sea water which is heated up successively from stage to stage by the heat given off by the condensable vapors upon condensation. By the time the condenser tube fluid reaches the outlet manifold 15 it has gone through a series of heating stages which raise its temperature substantially so that only partial additional heating is required before the fluid is introduced through the conduit 17 as liquid to be vaporized (e.g. heated sea water).

In systems of the type described, it is desirable to prevent condensable gases from leaking between adjacent stages (e.g. from higher pressure stage 10b to lower pressure stage 10c), and it is also desirable to vent non-condensable gases (such as air) from the system in order to maintain the desired partial vacuum. Between the circular edge of opening 12 in primary baffle 11 and the outer surface of the condenser tube 13 is an unsealed annulus 31 (shown somewhat exaggerated in FIGURE 2) through which condensable gases may leak. Providing this unsealed opening or anulus 31 with a mechanical seal is not particularly desirable because corrosion or the like may eventually wear away a mechanical seal and the seals are not readily replaceable because of the inaccessibility of openings in baffles located in the interior of chamber 10.

In accordance with the present invention, means, now to be described, are provided for simultaneously allowing the non-condensable gases to be vented successively from stage to stage through unsealed openings 31, while minimizing passage of the condensable gases through these unsealed openings. More specifically, transversely extending secondary baffles 27 or 37 having condenser tube-accommodating openings 38 are provided adjacent primary baffles 11 in most of the stages. In addition, referring, for purposes of illustration, to stage 10b, extending into the space between primary baffle 11 and secondary baffle 27 is the outlet end 29 of a conduit 28 having an inlet end 30 in a stage of higher pressure (e.g. 10a).

Conduit 28 may have inlet and outlet ends in adjacent stages, or in non-adjacent stages, the criterion being that there must be enough pressure differential between inlet end 30 and outlet end 29 to effect a passage of gases from the stage in which the inlet end is located to the stage in which the outlet end is located. Accordingly, non-condensable gases from the stage of higher pressure (e.g. 10a) will flow into inlet end 30, pass through conduit 28 and be directed by outlet end 29 into the space between the secondary baffle 27 and the primary baffle 11. This accumulation of non-condensable gases in the space between the primary and secondary baffles impedes the entry of condensable gases from stage 10b into this space, and accordingly minimizes the leakage of condensable gases through the unsealed openings 31 in primary baffle 11.

Such condensable gases as are conducted from stage 10a through conduit 28 are directed toward condenser tubes 13 causing a condensation of these condensable gases into droplets which ultimately fall into trough 24. The non-condensable gases accumulated in the space between the secondary and primary baffles pass through the unsealed openings 31, said unsealed openings performing the desired venting function for the non-condensable gases. Non-condensable gases passing from stage 10b through openings 31 to stage 10c are then conducted, together with non-condensable gases from stage 10c, through another conduit 28 into a space between a primary and secondary baffle in another stage of still lower pressure, this sequence of operation being repeated from stage to stage until the non-condensable gases pass into the last stage 10f from which the gases are exhausted through conduit 16.

The secondary baffle may extend only partially across the stage (e.g. like baffle 37) or it may extend entirely across the stage (e.g. like baffle 27) with the edges of the secondary baffle 27 being in contact with the interior surface of chamber 10 around substantially the entire periphery of the baffle 27. A baffle like type 27 causes a slight increase in pressure in the space between the primary and secondary baffles relative to the pressure in the rest of the same stage, which in turn facilitates venting of the non-condensable gases into the next succeeding stage. Baffle 27 may be provided with openings or channels 33 in its bottom portion to facilitate the passage of overflowed, non-vaporized, heated sea water through stage lower portion 20; or, as an alternative the bottom edge of baffle 27 can terminate at a line above the floor of lower portion 20, but below the liquid level therein. Baffle 27 also includes a channel for the passage of condensate in trough 24.

As shown in FIGURE 1, throttle means 32 is provided on each of the conduits 28 to control the flow of gases through the conduits.

There has thus been described a multi-stage flash evaporation system including gas-directing and confining means for simultaneously minimizing the leakage of condensable gases between the stages while venting non-condensable gases successively from stage to stage and out of the system.

Although the system has been described in connection with the desalting of sea water, it is not limited to this use, but can be utilized for multi-stage flash evaporation of many other vaporizable liquids. Furthermore, the foregoing detailed description has been given for clearness of understanding only, and no unnecessary limitations should be understood therefrom, as modifications will be obvious to those skilled in the art.

What is claimed is:

1. In a multi-stage flash evaporation system:
an elongated, substantially horizontally disposed chamber;
a plurality of substantially parallel, spaced-apart, primary baffles each extending transversely to said chamber, within the chamber, and dividing the chamber into a plurality of stages arranged in succession;
means for conducting a liquid, having non-condensable gases entrapped therein and vaporizable to produce condensable and non-condensable gases, successively through said stages along a lower part of said chamber;
means for maintaining successive stages at succeedingly lower pressures;
means in each stage for flashing a portion of the liquid, being conducted through the stage, into gases;
each of said primary baffles having a plurality of openings located above said liquid-conducting means;
each of said openings in a primary baffle being aligned with an opening in each of the other primary baffles;

a plurality of condenser tubes each extending longitudinally through said chamber, at a location above said liquid-conducting means, and each extending through aligned openings in each of said primary baffles;

each of said openings defining, with the adjacent outer surface portion of the condenser tube extending through the opening, an unsealed annulus;

means, located below said condenser tubes and above said liquid-conducting means, for accumulating condensate in each stage and for conducting condensate successively through said stages;

at least one of said stages being defined, at opposite ends, by a pair of spaced-apart primary baffles, a first of which separates said one stage from a stage of lower pressure and a second of which separates said one stage from a stage of higher pressure;

a secondary baffle within said one stage:

said secondary baffle extending transversely to said chamber and being substantially parallel to and spaced from each of said primary baffles in the one stage;

said secondary baffle being located closer to said first primary baffle than to said second primary baffle in the one stage;

said secondary baffle having at least a substantial portion thereof disposed above said condensate-conducting means;

said secondary baffle having a plurality of openings, located above said condensate-conducting means;

each of said condenser tubes extending through a respective one of said openings in the secondary baffle;

first conduit means having an inlet end in the one stage, between the secondary baffle and the second primary baffle and above the liquid-conducting means, for venting gas from said one stage;

and second conduit means having an outlet end at a location in said one stage between the secondary baffle and the first primary baffle and above the condensate-conducting means and an inlet end located above the liquid-conducting means in a second stage of higher pressure than said one stage;

whereby non-condensable gases are conducted from said higher pressure stage to said location, and the resulting build-up of non-condensable gases in said location prevents condensable gases in the one stage from accumulating at said location.

2. In the system recited in claim 1 wherein:

said secondary baffle has outer edges in contact with the interior wall surface of said chamber around substantially the entire periphery of said secondary baffle;

said secondary baffle has channel means at the level of said liquid-conducting means to permit passage of said liquid through the secondary baffle;

said secondary baffle has channel means at the level of said condensate-conducting means to permit the passage of condensate through the secondary baffle;

said flashing means including means, located between said secondary baffle and said second primary baffle in the one stage, for flashing said liquid being conducted through the one stage.

3. In a system as recited in claim 1 and comprising:

a third stage, of higher pressure than said second stage, and defined at opposite ends by a pair of spaced-apart primary baffles a first of which separates said third stage from said second stage;

a secondary baffle within said third stage;

said secondary baffle in the third stage extending transversely to said chamber and being substantially parallel to and spaced from said primary baffles in the third stage;

said secondary baffle in the third stage being located closer to said first primary baffle in the third stage than to the other primary baffle in the third stage;

said secondary baffle in the third stage having at least a substantial portion thereof disposed above said condensate-conducting means;

said secondary baffle in the third stage having a plurality of openings located above said condensate-conducting means;

each of said condenser tubes extending through a respective one of said openings in the secondary baffle in the third stage;

a third conduit means having an outlet end located between the secondary baffle and first primary baffle of the third stage, above the condensate-conducting means therein, and an inlet end located in a stage of higher pressure than said third stage and above the liquid-conducting means therein;

said inlet end of said conduit in the second stage being adjacent to said primary baffle separating the second stage from the third stage.

4. In a system as recited in claim 1 wherein said flashing means includes means, located between the secondary baffle and the second primary baffle in the one stage, for flashing said liquid being conducted through the one stage.

5. In a multi-stage flash evaporation system:

an elongated, substantially horizontally disposed chamber;

a plurality of substantially parallel, spaced-apart primary baffles each extending transversely to said chamber, within the chamber, and dividing the chamber into a plurality of stages arranged in succession;

means for conducting a liquid, having non-condensable gases entrapped therein and vaporizable to produce condensable and non-condensable gases, successively through said stages along a lower part of said chamber;

means for maintaining successive stages at succeedingly lower pressures;

means in each stage for flashing a portion of the liquid, being conducted through the stage, into gases;

each of said primary baffles having a plurality of openings located above said liquid-conducting means;

each of said openings in a primary baffle being aligned with an opening in each of the other primary baffles;

a plurality of condenser tubes each extending longitudinally through said chamber, at a location above said liquid-conducting means, and each extending through aligned openings in each of said primary baffles;

each of said openings defining, with the adjacent outer surface portion of the condenser tube extending through the opening, an unsealed annulus;

means, located below said condenser tubes and above said liquid-conducting means, for accumulating condensate in each stage and for conducting condensate successively through said stages;

at least one of said stages being defined, at opposite ends, by a pair of spaced-apart primary baffles, a first of which separates said one stage from a stage of lower pressure and a second of which separates said one stage from a stage of higher pressure;

and conduit means for conducting gases from a first location, above the liquid-conducting means in a second stage of higher pressure than said one stage, to a second location above said condensate-conducting means and adjacent said first primary baffle in said one stage;

said one stage including secondary baffle means, located closer to said first primary baffle than to said second primary baffle, for confining to said second location said gases conducted to said second location by said conduit means.

6. In a multi-stage flash evaporation system:

an elongated, substantially horizontally disposed chamber;

means defining a plurality of separate, discrete stages arranged successively along the length of said chamber;

means for maintaining successive stages at succeedingly lower pressures;

one of said stages being defined at opposite stage ends by a pair of substantially parallel, spaced-apart primary baffles extending transversely to said chamber within the chamber;

a first of said primary baffles separating said one stage from a stage of lower pressure and a second of said primary baffles separating the one stage from a stage of higher pressure;

means for conducting a liquid, vaporizable into condensable and non-condensable gases, successively through a stage of higher pressure than said one stage and then through said one stage, along a lower part of said chamber;

said first primary baffle in the one stage having an opening located above said liquid-conducting means;

a condenser tube extending longitudinally through said one stage and through said opening in the first primary baffle;

said opening defining, with the adjacent outer surface portion of the condenser tube extending through the opening, an unsealed annulus;

means, in said one stage, for flashing a portion of the liquid, being conducted through the one stage, into gases;

means, located below said condenser tube and above said liquid-conducting means in the one stage, for accumulating condensate and for conducting condensate out of the one stage;

means, in said stage of higher pressure than said one stage, for flashing said vaporizable liquid into condensable and non-condensable gases;

means, in said higher pressure stage, for condensing condensable gases therein;

and conduit means for conducting said non-condensable gases from said stage of higher pressure to a location, in the one stage, above said condensate-conducting means and adjacent said first primary baffle;

said one stage including secondary baffle means, located closer to the first primary baffle than to the second primary baffle, for confining to said location said non-condensable gases conducted to said location by said conduit means.

7. In the system recited in claim 5 wherein said outlet end of said conduit means comprises means for directing gas from said conduit means toward condenser tube portions located between the first primary and secondary baffles.

8. In the system recited in claim 5 and comprising throttle means on said conduit means.

9. In the system recited in claim 5 wherein said pressure lowering means comprises means connected to the lowest pressure stage for exhausting gases therefrom.

References Cited by the Examiner
UNITED STATES PATENTS 2,704,742 3/55 Petrich _____ 202—173
2,759,882 8/56 Worthen et al. _____ 202—45
2,944,599 7/60 Frankel.

FOREIGN PATENTS 815,796 7/59 Great Britain.

OTHER REFERENCES

"Chemical Engineering," October 1956, pp. 126–134.

NORMAN YUDKOFF, *Primary Examiner.*
ALPHONSO D. SULLIVAN, *Examiner.*